US006882840B2

(12) United States Patent
Fujiwara

(10) Patent No.: US 6,882,840 B2
(45) Date of Patent: Apr. 19, 2005

(54) COMMUNICATION SYSTEM CAPABLE OF REDUCING COMMUNICATION LOAD

(75) Inventor: Ryuhei Fujiwara, Tokyo (JP)

(73) Assignee: NEC Corporation, Tokyo (JP)

( * ) Notice: Subject to any disclaimer, the term of this patent is extended or adjusted under 35 U.S.C. 154(b) by 620 days.

(21) Appl. No.: 09/892,657

(22) Filed: Jun. 28, 2001

(65) Prior Publication Data

US 2002/0002047 A1 Jan. 3, 2002

(30) Foreign Application Priority Data

Jun. 29, 2000 (JP) ........................................ 2000-195857

(51) Int. Cl.⁷ ................................................ H04Q 7/20
(52) U.S. Cl. ................ 455/432.3; 455/403; 455/456.6; 455/517
(58) Field of Search ............................. 455/412.1, 413, 455/414.1, 417, 403, 424, 425, 426.1, 432.3, 457, 456.6, 514, 517, 550.1; 379/88.04, 88.22

(56) References Cited

U.S. PATENT DOCUMENTS

| 5,535,429 | A | * | 7/1996 | Bergenlid et al. ........... 455/507 |
| 6,157,827 | A |   | 12/2000 | Fujiwara ..................... 455/413 |
| 6,292,743 | B1 | * | 9/2001 | Pu et al. ..................... 701/202 |
| 6,577,881 | B1 | * | 6/2003 | Ehara .......................... 455/563 |

FOREIGN PATENT DOCUMENTS

| JP | 10-150460  | 6/1998 |
| JP | 2924865    | 5/1999 |
| JP | 2000-82007 A | 3/2000 |
| JP | 2000-90039 | 3/2000 |

* cited by examiner

Primary Examiner—Jean Gelin
(74) Attorney, Agent, or Firm—Foley & Lardner LLP

(57) ABSTRACT

A portable information terminal is connected through a radio base station and the like to the Internet. Furthermore, a music server, a mail server and a distribution center are connected to the Internet. The distribution center distributes data stored in the music server and mail server. The distribution center includes a distribution server, a distribution data store memory in which data for the distribution is transiently stored and a radio unit which wirelessly distributes data to the portable information terminal. When accesses are concentrated on the music server from the distribution information terminals, the music server transfers a file including music data to the distribution center. The distribution center wirelessly transfers the file to each of the portable information terminals with temporal dispersion. Thus, even if the accesses for the communications are temporarily concentrated on the particular apparatuses such as the server, employing the above structure allows the communication system to avoid the occurrence of an overload condition.

13 Claims, 14 Drawing Sheets

Fig. 7

| FOLDER NAME | FUNCTIONAL ATTRIBUTE | ACTUATION ATTRIBUTE | CONDITION | FILE NAME |
|---|---|---|---|---|
| A | SYNCHRONIZATION | PERIOD | FOR EACH HOUR | $F_1$ |
| B | SYNCHRONIZATION | PERIOD | FOR EACH HOUR | $F_2$ |
| C | SYNCHRONIZATION | REAL TIME | | $F_3$ |
| D | SYNCHRONIZATION | MANUAL | | $F_4$ |
| E | TRANSFER | SPECIFICATION TIME | 3:25 | $F_5$ |

COMMUNICATION SYSTEM CAPABLE OF REDUCING COMMUNICATION LOAD

BACKGROUND OF THE INVENTION

1. Field of the Invention

The present invention relates to a communication system using a radio apparatus. More particularly, the present invention relates to a communication system that can reduce a communication load on an information provider of various contents or data.

2. Description of the Related Art

Recently, various radio apparatuses such as a portable telephone are widely used not only for calls but also for various other communications. Such communications include, for example, a download of data such as music data and the like from a predetermined home page by using the Internet, reception of mail, and upload of picture data, such as a photograph taken by a user, to a home page of a dealer in order to produce a photograph album.

An example of such a communication system is the Japanese Laid Open Patent Application (JPA 2000-90039) that discloses "Music Distributing Method, Transmitting Apparatus And Method, And Reproducing Apparatus And Method". In this communication system, a music server and a client are connected to the Internet. The client prepares a public key and a secret key based on an ID unique to the reproducing apparatus. The public key is sent to and registered in a server, and the secret key is stored in the reproducing apparatus. The client requests the server to distribute music data. The encryption based on the registered public key is performed on the music data fetched from a music database (DB). The encrypted music data is sent to the client, and stored in the reproducing apparatus. At a time of a reproduction, the music data is decoded and reproduced in accordance with the secret key stored in the reproducing apparatus. The music data stored in the reproducing apparatus is encrypted in accordance with the key prepared on the basis of the ID unique to the reproducing apparatus. Thus, the other reproducing apparatuses cannot reproduce the music data. This configuration enables a system for distributing music data to sufficiently protect the copyright of the music data to be distributed.

Also, Japanese Laid Open Patent Application (JP-A-Heisei, 10-150460) discloses "Radio Picture Communication System". In this radio picture communication system, a video server opens various picture information stored therein as a common file onto a network. A terminal station sends a title of picture information, which it desires to receive, as control information to a radio control station by using a second radio communication path. The control radio station sends the title of the picture information included in the control information received from the terminal station, to a radio picture station, and then instructs to send this picture information to the terminal station. In response to this instruction, the radio picture station reads out the picture information corresponding to the instruction from the common file, and then sends the picture information to the terminal station by using the first radio communication path. Thus, the radio picture terminal can conveniently receive high quality picture information.

Moreover, Japanese Patent No. 2924865 discloses "Voice Mail System". In this voice mail system, a server and one or more terminals are connected through a communication medium to each other. The serer manages a memory for storing a plurality of voice mail data as an identifiable file in a memory area assigned for each terminal. The server is provided with transmitting means and memory control means. The transmitting means, when receiving a mail request through the communication medium from the terminal, reads out the voice mail data from the memory area of the memory assigned to a terminal of its transmission source, and transmits to the terminal of the transmission source. The memory control means, when receiving a mail edition signal, insert or add the voice mail data in the mail edition signal to a position specified by the mail edition signal, in the memory area of the memory assigned to the terminal of the transmission source. This configuration allows for extremely effective communication in a communication network characterized by high costs and transmission speeds slower than that of a wire line, because the same voice mail data is not transmitted and received between the server and the same terminals multiple times.

FIG. 1 shows an example of the conventional communication system disclosed in Japanese Laid Open Patent Application (JPA 2000-90039), in which a portable telephone is used as a radio apparatus. In this communication system, a portable telephone 101 wirelessly communicates with a base station 102. The base station 102 is connected to a portable telephone network 103, and the portable telephone network 103 is connected to the Internet 104. A content server 105 for providing various contents is connected to the Internet 104. The portable telephone 101 can access the desirable content from server 105 through the portable telephone network 103 and the Internet 104. For the purpose of easy explanation, FIG. 1 shows one portable telephone 101, one base station 102 and one content server 105.

In this communication system, let us suppose that the content server 105 is a server that exclusively provides a service of downloading music data. When a new song of a popular singer or the like is sold or a hit song is produced, a large number of portable telephones 101 access the content server 105 dedicated to the music downloading operation. The content server 105 establishes a link to each of the portable telephones 101 accessing the server, and distributes the music data requested by each of them. Thus, if the accesses are concentrated on the particular content server 105, the data distribution rate per hour for each portable telephone 101 from the content server 105 becomes very small. As a result, the time it takes for each portable telephone 101 to download the music data becomes long. Hence, this results in high communication costs.

Conventionally, the above problem is solved by employing a structure of several servers alongside the content server 105 in order to distribute the load. Such structure causes the facility cost on the side of the content server 105 to be increased. Such a measure may be effective for a content server 105 having a high access frequency. However, if the accesses are temporarily concentrated on a server, the fact that the size of the facility depends on the access peak creates a problem related to efficient use of the communication system. Thus, the problem that the downloading of data in the case of load concentration requiring abnormally long time is still not solved in many content servers.

As mentioned above, the music distribution has been described as an example. However, there may be a case that an overload is temporarily induced on the server side when electronic mails are collectively distributed to the side of the portable telephones, or when personal information is distributed to the portable telephones under a predetermined condition. This results in a similar problem, induced even when the uploading operations are temporarily concentrated.

SUMMARY OF THE INVENTION

Therefore, an object of the present invention is to provide a communication system which can avoid an overload condition even if accesses for communication are temporarily concentrated on a particular apparatus such as a server and the like.

In order to attain the above-mentioned objective, a communication system according to the first aspect of the present invention includes a network, a distribution center and a client terminal.

The distribution center is comprised of a distribution server containing any number of first folders to which files read from a content server connected to said network, an actuation timing setting section for setting actuation time to process the files stored in the first folders, a file read section for reading out the corresponding file at the arrival of the actuation timing set by the actuation timing setting section and a radio transmitter for wirelessly transmitting the file read by the file read section.

The client terminal is composed of any number of second folders which are correlated to at least a part of the first folders in a one-to-one relationship, a radio receiver for wirelessly receiving the file transmitted by the radio transmitter and a storing section for storing the file received by the radio receiver in the second folder corresponding to the first folder.

That is, in the first aspect of the present invention, the distribution server and client terminal have any number of folders in which at least parts thereof are correlated to each other in the one-to-one relationship. The distribution server stores a file read from a content server in the first folder. The actuation timing setting section sets an actuation timing to process the file stored in the first folder. The file read section reads the corresponding file at the arrival of the actuation timing set by the actuation timing setting section. The radio transmitter wirelessly transmits the read file to the client terminal. In the client terminal, the radio receiver receives the file transmitted by the radio transmitter. The received file is stored in the second folder corresponding to the first folder.

Thus, for example, if the downloading of a predetermined file is requested by more than one client terminal, and a long time is required in order for the transfer of the file to those client terminals, the content server from which the downloading of the file is requested stores the file in the first folder of the distribution server. Since the distribution server has the folder correlated to the client terminal, the distribution server can wirelessly transmit the requested file, in a way that the loads are dispersed by setting the actuation timings.

Such a configuration including a distribution server as a mediator between the portable information terminal and the content server, on which the accesses from the clients are temporarily concentrated, allows for spreading of the transfer load. It is also efficient to install a cache memory in the distribution server.

In the first aspect of the present invention, the actuation timing setting section may set a periodic interval as the actuation timing. If the transfer of the file is not urgent, the processes on the distribution server can be dispersed by properly setting the periodic interval.

In the first aspect of the present invention, the actuation timing setting section may be used to set a time as the actuation time. According to this configuration, in a case of a file transfer that is not urgent, night time can be used to thereby lower a communication fee and also attain the effecient usage of the distribution server.

In the first aspect of the present invention, the actuation timing setting section may be actuated when a new file is stored in the first folder, and the corresponding file stored in the first folder is removed after the new file is transferred to the second folder through the radio transmitter and the radio receiver and is stored therein.

This exemplifies a case in which the transmission is done at real time when the file is stored. As for the transfer of an urgent file, this configuration also allows for an urgent distribution of the file. Of course, if the distribution server is responsible for the distributions of the files from the various servers and the like, the transfer timings of the urgent files can be dispersed entirely and temporally. Thus, there is little fear that the loads are concentrated within a particular time frame.

A communication system according to a second aspect of the present invention is composed a network, a distribution server which is connected to the network and has a first folder, a mobile terminal which is connected to the network and has a second folder correlated with the first folder, and a position detector which detects a current position of the mobile terminal. The distribution server includes a file transmitting section that wirelessly transmits a file stored in advance in the first folder to the second folder when the position detector detects that the current position of the mobile terminal is a predetermined position.

According to this communication system, the mechanism in which a necessary file is transferred from the distribution server to the mobile terminal, with positional information as a trigger, is effective as an area guide and the like, such as a case when a user of the mobile terminal visits an unfamiliar place.

In the second aspect of the present invention, the file transmitted by the file transmitting section is the file for storing information of a predetermined territory, and the mobile terminal has an information display for displaying the information of the territory when receiving this file.

That is, the mobile terminal has the information display for displaying information, such as a display, a speaker or the like, and the file for storing the information of the predetermined territory is sent and displayed by the display.

A communication system according to a third aspect of the present invention is composed of a network, a mobile terminal which has a first folder and a first communication unit for carrying out a radio communication, a distribution server which is connected to the network and has a memory region correlated to the first folder and a second communication unit for carrying out a radio communication and a file transferring unit which, when a file is stored in the memory region of the distribution server, transfers the file to a particular memory region which is connected through the network to the distribution server.

According to this communication system, if the uploading operations of the files from the mobile terminals are concentrated on the predetermined regions among the several particular memory regions, the distribution server is placed between them. Then, the mobile terminal stores the file in the individual memory region corresponding to each of the mobile terminals within the distribution server. Thus, the concentration of the loads is avoided. Hence, this has a merit that the mobile terminal can transmit and receive the file without directly recognizing the location of the particular memory region.

BRIEF DESCRIPTION OF THE DRAWINGS

FIG. 7 is an explanation view showing an example of a folder used in the first embodiment;

DESCRIPTION OF THE PREFERRED EMBODIMENTS

The present invention will be described below in detail with reference to the following embodiments.

(First Embodiment)

Figure 1:
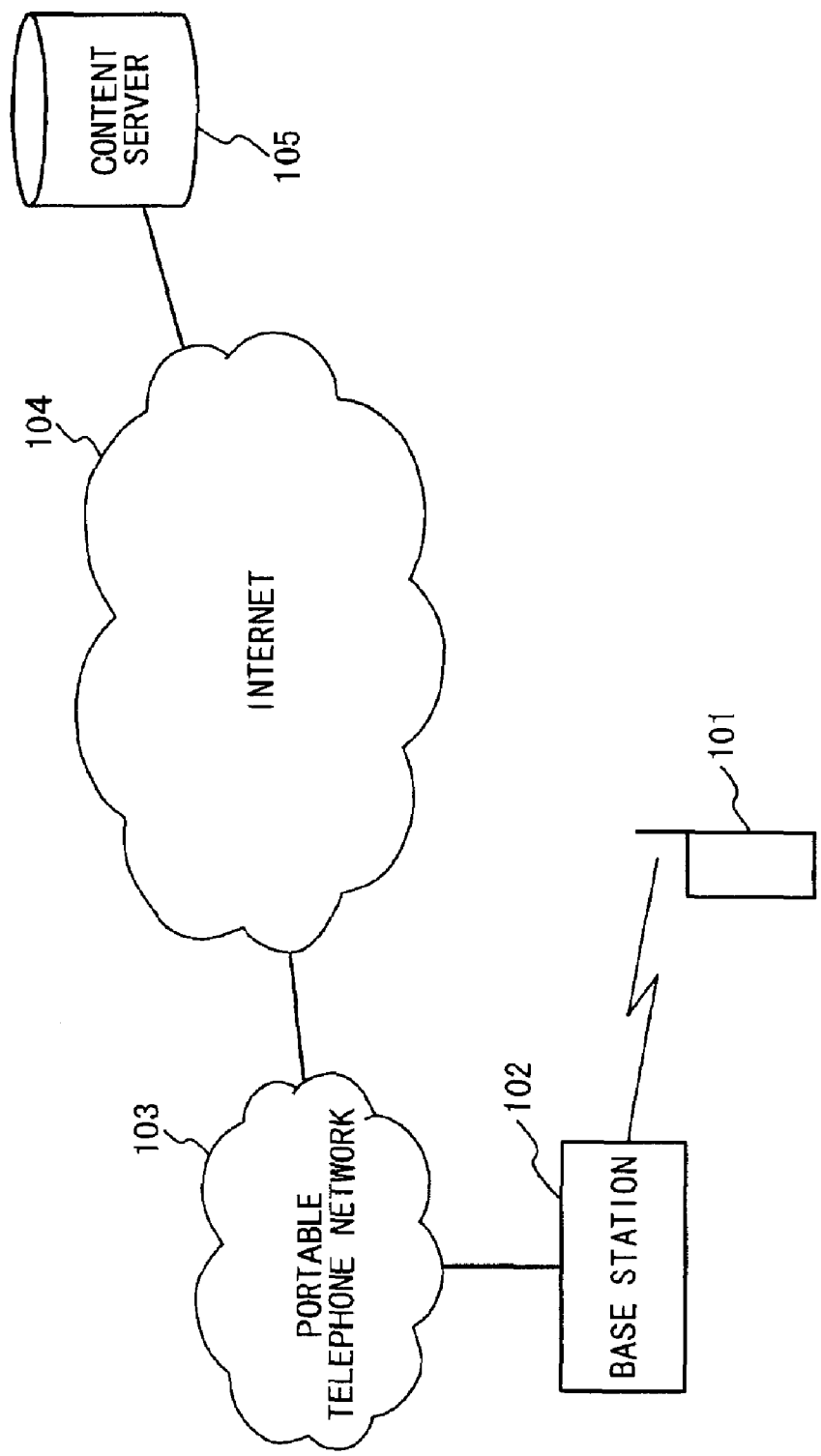
FIG. 1 is a system configuration view showing an example of a conventional communication system in which a portable telephone is used as a radio unit.
Figure 2:
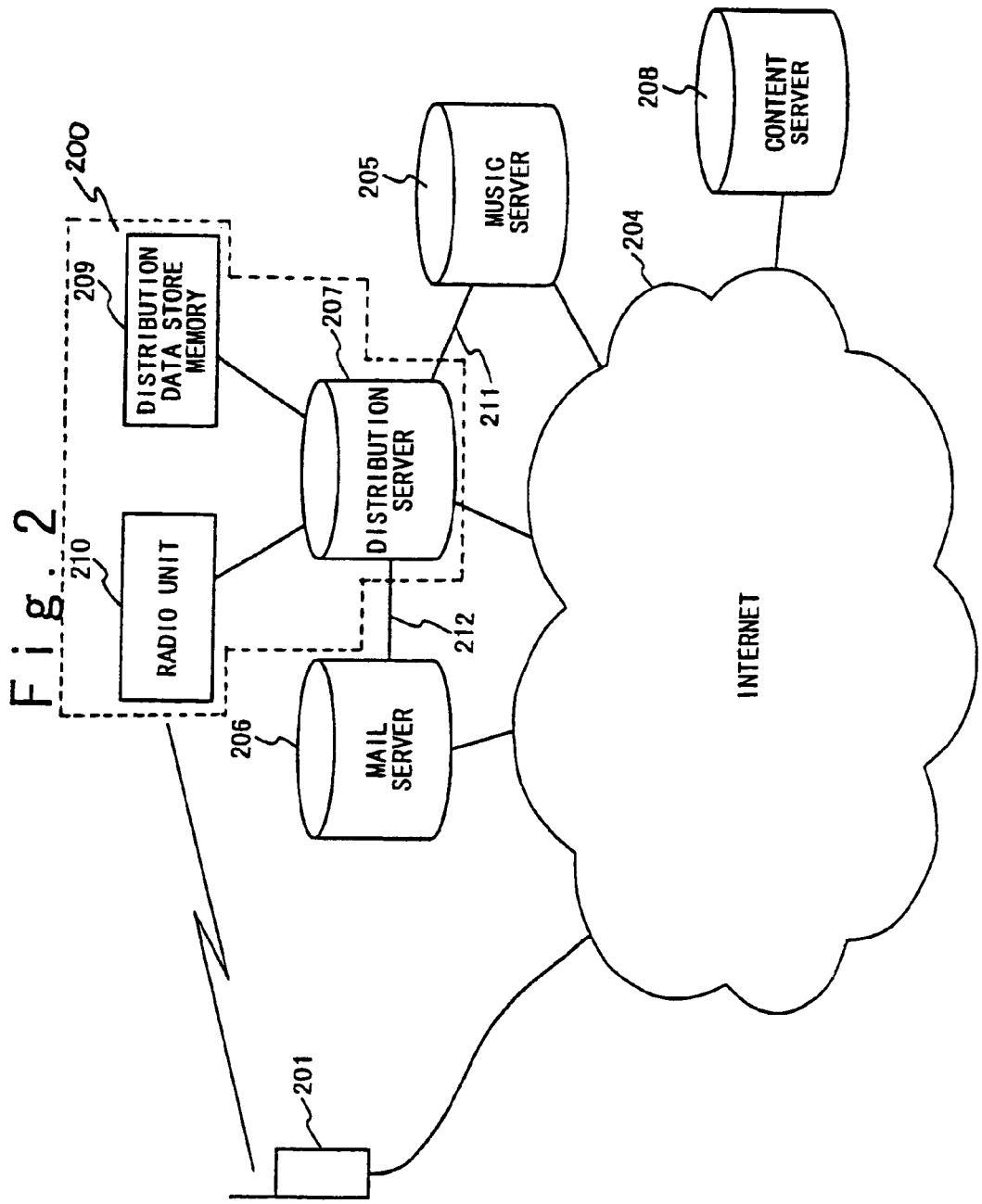
FIG. 2 is a system configuration view showing a schematic configuration of a communication system in a first embodiment of the present invention.

FIG. 2 shows the schematic configuration of a communication system in a first embodiment of the present invention. In this communication system, a portable information terminal 201, represented by a portable telephone or a portable computer having a communication function, is connected through a radio base station or a circuit device (not shown), such as a modem (a modulation demodulation device), a router and the like, to the Internet 204. A music server 205 for storing a content of music and a mail server 206 for storing mail are connected to the Internet 204, as an example of a content server for providing various contents. Also, a distribution center 200 includes a distribution server 207 for distributing the data of the content servers 205, 206 and a predetermined content server 208 used for accumulating a home page as a portal site. The content servers 205 and 206, and the predetermined content server 208 are also connected to the Internet 204. The distribution center 200 also contains a distribution data store memory 209 for transiently storing the data for distribution and a radio unit 210 for wirelessly distributing the data to the portable information terminal 201. A private cable 211 connects the music server 205 and the distribution server 207 and a private cable 212 connects the mail server 206 and the distribution server 207.

Figure 3:
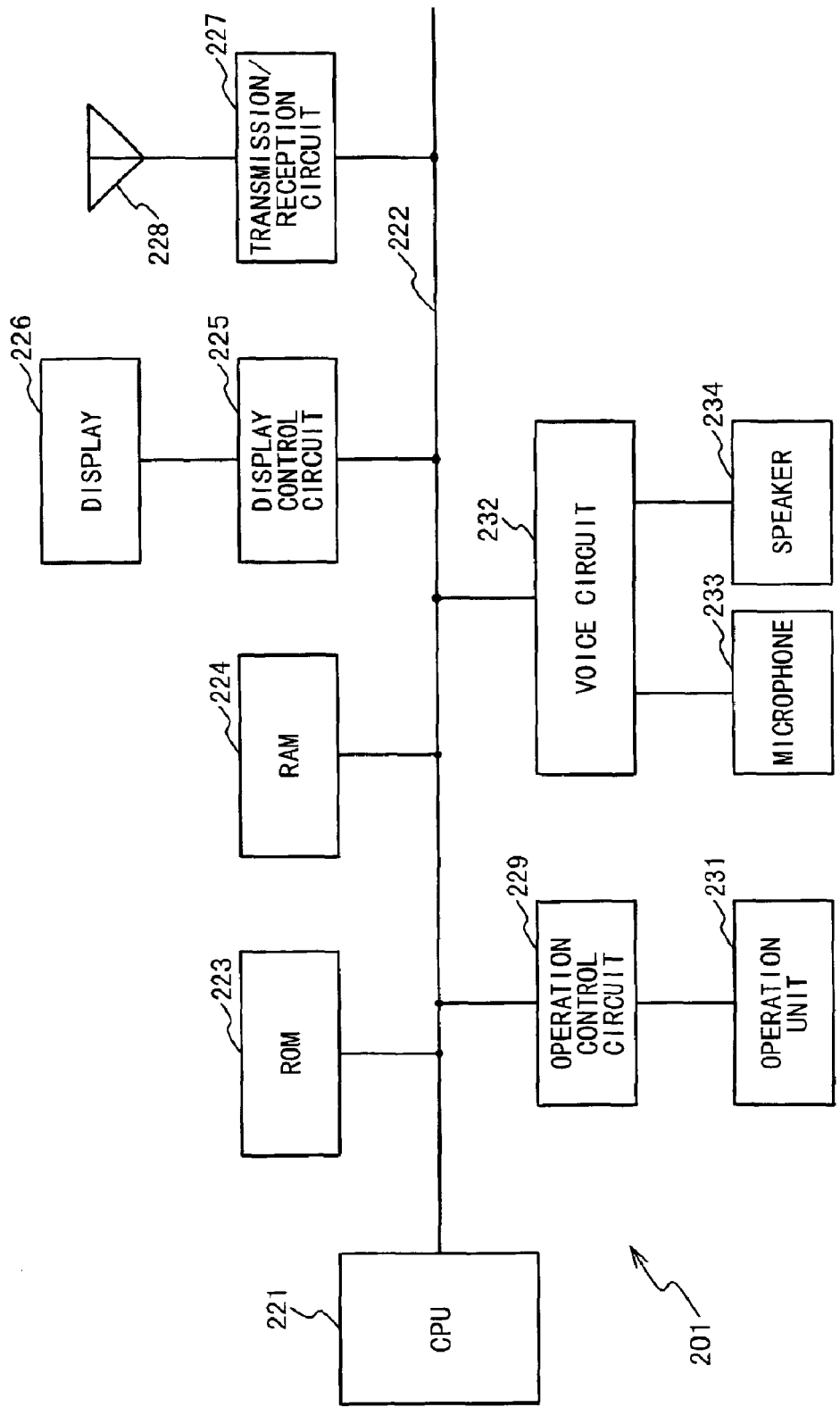
FIG. 3 is a block diagram showing the main configuration of a portable information terminal used in the first embodiment.

FIG. 3 is a block diagram showing the main configuration of the portable information terminal used in the first embodiment. The portable information terminal 201 is composed of a CPU (Central Processing Unit) 221, ROM 223, RAM 224, a display control circuit 225, a display 226, a transmission/reception circuit 227, an antenna 228, an operation control circuit 229, an operation unit 231, a voice circuit 232, a microphone 233, a speaker 234 and a bus 222.

The CPU 221 is connected through the bus 222, such as a data bus, an address bus, a control bus and the like, to respective sections within the portable information terminal. The ROM 223 is a read only memory for storing a program to carry out various controls of the portable information terminal 201 and other fixed data. The RAM 224 is a memory for work. The RAM 224 constitutes a detachable memory medium. If a detachable memory medium having a relatively large capacity is assembled in the portable information terminal 201, a large amount of downloaded music data and the like can be stored in the medium.

The display control circuit 225 is used to display visual data on the display 226, such as a liquid crystal or the like, assembled in the portable information terminal 201. The transmission/reception circuit 227 is used when data is transmitted and received through an antenna 228. The operation control circuit 229 is used to input operation data from the operation unit 231 having a plurality of button switches (not shown) and control turning those button switches on or off. The voice circuit 232 is used for controlling an input/output of a voice, and it is connected to the microphone 233 and the speaker 234.

It should be noted that the music server 205, the mail server 206 and the content server 208 which are shown in FIG. 2 have the configurations basically equal to those of a typical computer. Thus, those explanations are omitted. The distribution server 207 also has similar configuration. However, it is structurally different in that it has the distribution data store memory 209 and the radio unit 210 wirelessly and automatically connected to the portable information terminal 201 in order to carry out a communication.

Downloading of Music Data

At first, a case in which a user of the portable information terminal 201 shown in FIG. 2 downloads music data utilizing the above communication system is described as an example. In this case, the user of the portable information terminal 201 initially accesses a predetermined portal site on the Internet 204.

Figure 4:
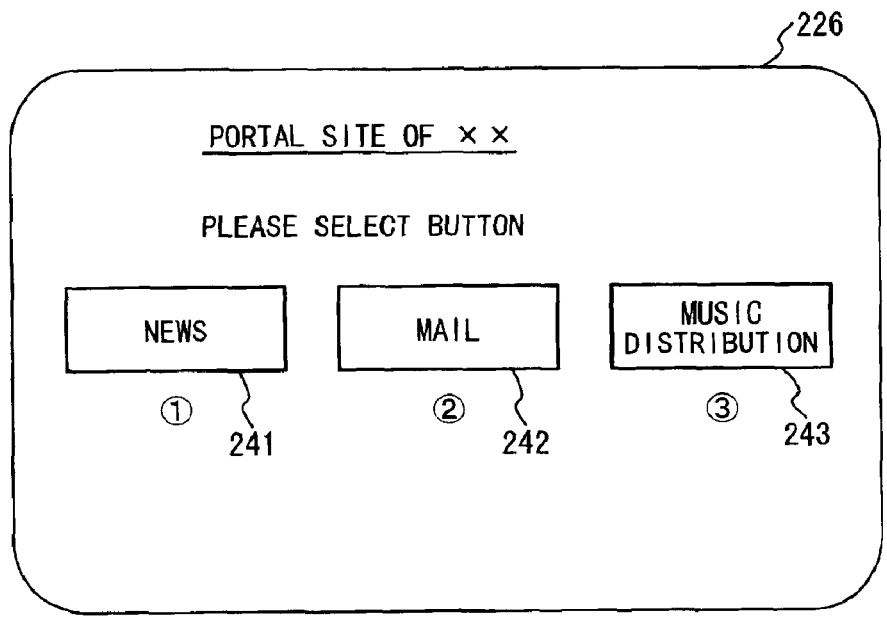
FIG. 4 is a plan view of a display showing an example of a menu screen when a user accesses a portal site, in the first embodiment.

FIG. 4 shows an example of a menu screen when the user accesses the portal site. The menu screen customized for each user of the portable information terminal 201 is displayed on the display 226. In this example, a news button 241 for selecting a news site, a mail button 242 for setting mail distribution and a music distribution button 243 for accessing a home page to distribute music are placed on the screen.

In this case, it is supposed that the user of the portable information terminal 201 selects the music distribution button 243. When the music distribution button 243 is selected, the CPU 221 (FIG. 3) controls the access to the music server 205 shown in FIG. 2, in accordance with a URL (Uniform Resource Locator) prepared in advance. Thereby, a menu screen of its home page is displayed on the display 226.

Figure 5:
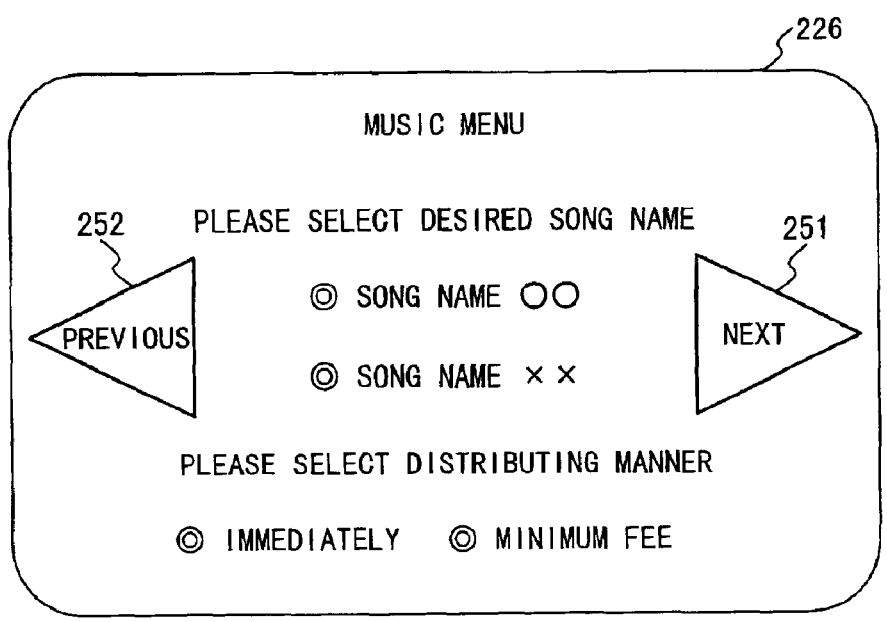
FIG. 5 is a plan view of a display showing an example of a menu screen for music distribution when a user selects a button "Music Distribution" in the first embodiment.

FIG. 5 shows an example of a menu screen for a music distribution when the user selects a button "Music Distribution". The menu screen is designed that a predetermined number of songs whose distributions are desired are displayed on the display 226. So, the user selects a desirable song from the displayed songs by using a radio button. If the desirable song is not displayed, the user can select a next button 251 or a previous button 252 to locate other song names.

This menu screen allows the user to also select a manner of distributing music. If the user selects an item "Immediately", although a downloading fee is comparatively expensive, the distribution is immediately started. If the user selects an item "Minimum Fee", instead of the comparatively cheap downloading fee, the distribution is carried out in a time band in which the downloading work is relatively empty. In the system shown in FIG. 2, although the distribution server 207 has the radio unit 210, there may be a case that another radio unit or another radio facility is used to send the data to the portable information terminal 201. In the latter case, the data may be sent through a line up to the radio unit or the radio facility. In such instances, the data may be sent in a time frame in which the line is not busy or in the nighttime when the usage fee of the line is low, and thus, try to lower the communication cost. Thus, if the user selects the item "Minimum Fee", it takes a period of a half day or a day for the user to receive the distributed desirable music.

It should be noted that the fee system is not limited to two options, but may also employ three or more options, depending on the music server 205. For example, a fee system of three options such as "Immediately", "Within Five Hours" and "Within One Day" may be employed. When the user of the portable information terminal 201 selects music and a distributing manner on the menu screen shown in FIG. 5 and then the data according to the selection is sent to the music server 205, data to confirm the user is sent from the music server 205 or the distribution server 207 to the portable information terminal 201, and a confirmation screen is displayed. Since the distribution of music is usually for a fee, an input of a password is required. Thus, it is possible to prevent others from illegally requesting the downloading.

Figure 6:
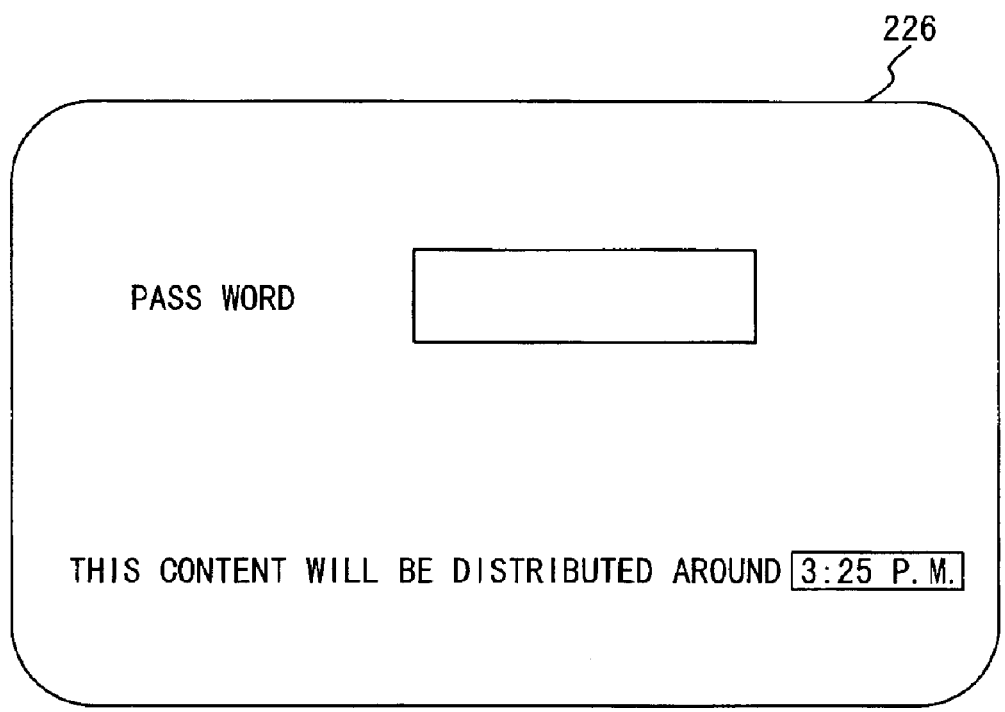
FIG. 6 is a plan view of a display when a user selects an item "Minimum Fee" in the first embodiment.

FIG. 6 shows an example of a user confirmation display when the user selects the item "Minimum Fee". When the user selects the item "Minimum Fee", the music server 205 entrusts the distribution server 207 with the distribution of the music. The distribution server 207 determines a time at which the music may be distributed at the lowest fee, and returns the time back to the portable information terminal 201 as time data for the expected distribution time, and it is displayed on the display 226.

On the other hand, if the user of the portable information terminal 201 selects the item "Immediately" from the display content of FIG. 5, the music server 205 sends information of this selection to the distribution server 207 and instructs the immediate execution of the distribution. At this time, the password is also requested for the sake of the user confirmation.

The first embodiment employs the manner of entrusting the distribution server 207 with all the distributions. However, it is not always limited to this manner. For example, only in the case of the selection of the item "Immediately", the music server 205 can immediately execute the distribution by using a route connected through the Internet without any intervention of the distribution server 207. It is imagined that the number of people who select the item "Immediately" is relatively low because of the fee. Thus, even if the music server 205 performs the direct distribution to those people, the occurrence of the overload caused by the concentration of the downloading operations is not easily induced. On the contrary, when the music server 205 entrusts the distribution server 207 with the collective distribution, it is possible to simplify the process of the distribution, the process for charging the fee and the process for solving the trouble associated with the downloading operation and the like.

The portable information terminal 201 and the distribution server 207 in the first embodiment have the radio units, respectively. So, they can be automatically connected to each other, and the data can be sent and received between them. The portable information terminal 201 and the distribution server 207 have a folder all or a part of which has the identical directory structures, in order to manage the operation of sending and receiving the data.

FIG. 7 shows an example of a list of folders used in the first embodiment. The list contains information to identify an attribute of a communication condition of a registered file. Every folder constitutes a directory. By default, this information (hereafter, referred to as a communication condition file) occupies a part of the folders constituting the directory. Also, the list contains information to identify the registered files every folder constituting the directory. By default, this information (hereafter referred to as an ID file) occupies a part of the folders constituting the directory.

A folder "A" and a folder "B" are designed such that the portable information terminal 201 and the distribution server 207 shown in FIG. 2 check a content of the folder "A" and "B" for each hour indicated by "Condition", and the names of the files are "$F_1$" and "$F_2$". Here, a functional attribute "Synchronization" implies that the portable information terminal 201 and the distribution server 207 have folders with the same content. If the files registered in the folders with the same name are different between the portable information terminal 201 and the distribution server 207, the missing file is copied to the Portable Information Terminal or the distribution server through the radio communication between them. Also, if a file is removed in either one of them, the same file as the removed file is removed from the other. The first embodiment employs a protocol involving a transmission confirmation control so that the above-mentioned copy or removal can be perfectly executed.

A folder "C" is designed so that an actuation attribute is set to "Real Time", namely, when a file is added or removed, it is added or removed from both the Portable Information Terminal and the distribution server. Its file name is "$F_3$". That is, if the actuation attribute is "Real Time", if, for example, at the time the distribution server 207 adds a file, a radio communication is immediately executed. So, the same file is added to the portable information terminal 201. If a file is removed from one side, the same file is also removed from the other side.

In folder "D", the actuation attribute is "Manual", and the function attribute is "Synchronization". Thus, the content of the corresponding files in the Portable Information Terminal and the distribution server are manually synchronized. The file name is "$F_4$". In the case of "Manual" actuation attribute, a metaphor is equipped to report to the user the presence of target information. The target information is synchronized by using an ID file which can be identified by a file registered in a folder assigned to it. The user, when needing a body of the file, specifies the metaphor and carries out a communication actuation.

In folder "E", the function attribute is "Transfer". An actuation time for a transfer is set at "3:25" as a "Condition". The file name is "$F_5$". In the case of "Transfer", there is a directionality of a communication. That is, if a file registered in this folder is not present on a partner side between the portable information terminal 201 and the distribution server 207, its file is transmitted via a radio communication to the partner side. When the transmission is completed, the file of the transmission source is erased.

It should be noted that "Period", "Real (Real Time)", "Manual" and "Time Specification" as actuation attributes in the list of the folders shown in FIG. 7 are merely examples. For example, "position" can be used as actuation attribute. This will be explained later. So, when the portable information terminal 201 enters into a particular position (area), it is actuated. Then, a particular file is copied, transferred or removed.

Figure 8:
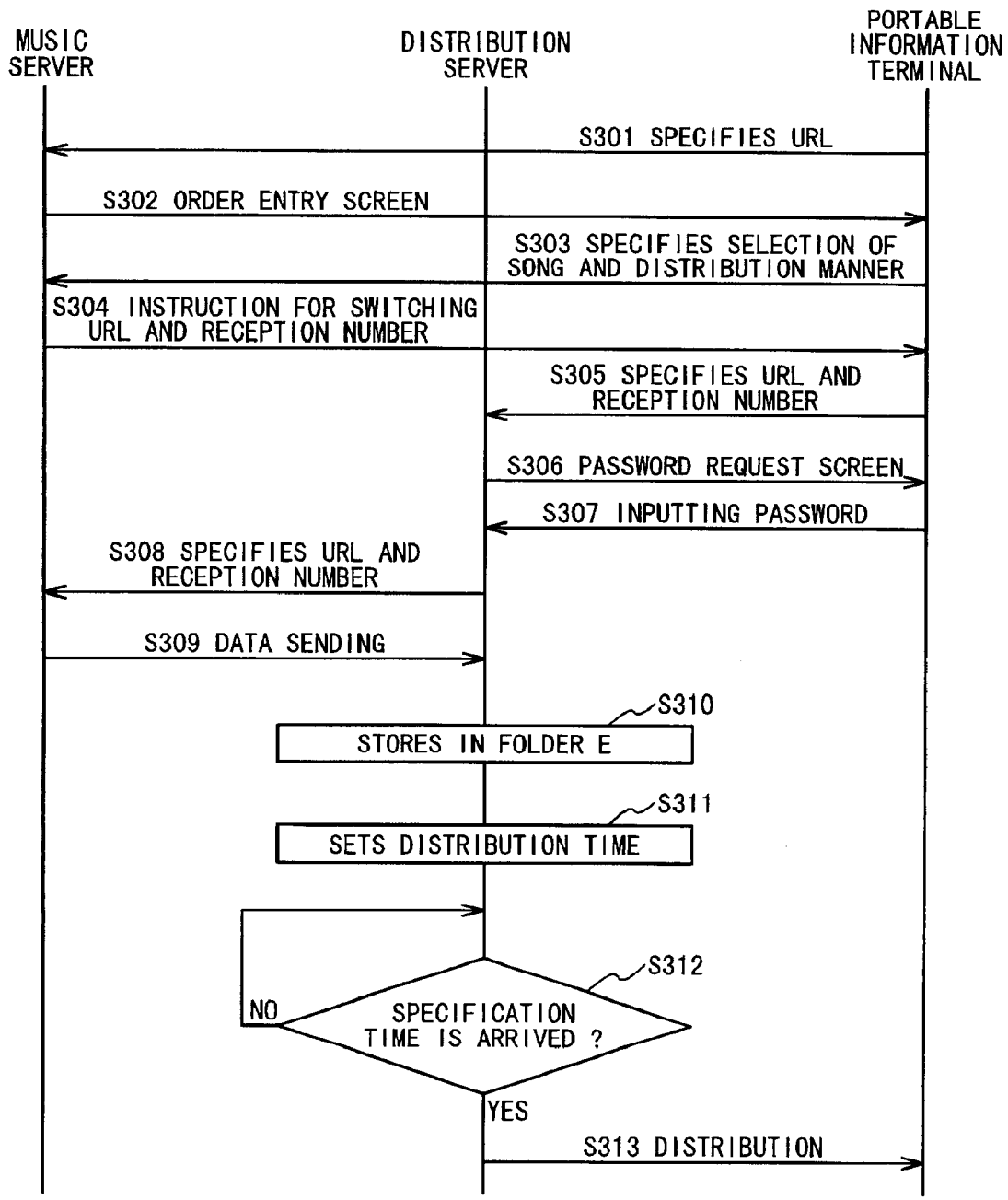
FIG. 8 is an explanation view showing a flow processes among a music server, a distribution server and a portable information terminal when the distribution server transmits music data to the portable information terminal, in the first embodiment.

FIG. 8 flow chart of a process among the music server, the distribution server and the portable information terminal when the distribution server transmits music data to the portable information terminal. When the music distribution button 243 is pushed at the portal site shown in FIG. 4, the portable information terminal 201 specifies a URL of the music server 205 shown in FIG. 2 (Step S301). If there is an access through the Internet 204, the music server 205 transmits data through the Internet 204 to the portable information terminal 201 (Step S302) to indicate an order entry screen as the one shown in FIG. 5. In response to the transmission (Step S303), the portable information terminal 201 specifies a selection of a song and a distribution manner. Upon receiving this specification, the music server 205 invokes an external program from an HTML program by using a CGI (Common Gateway Interface) and transmits an instruction to switch the URL to the distribution server 207 (FIG. 2) and a reception number to the portable information terminal 201 (Step S304). After that, the portable information terminal 201 sends and receives the data to and from the distribution server 207. Specifically, the portable information terminal 201 sends the received URL of the distribution server 207, the reception number and a song name targeted for the downloading operation to the distribution server 207 (Step S305). It should be noted that, which server is used as the distribution server 207 by the music server 205 is determined in advance between the two of them.

The distribution server 207, when receiving the reception number, sends a password request screen shown in FIG. 6, in order to confirm the user using the portable information terminal 201 (Step S306). The password inputted by the user is transferred to the distribution server 207 (Step S307). If the inputted password is correct, the distribution server 207 specifies the URL of the music server 205. If the reception number and the song name to download the music data and its song data are stored in a cache memory formed in the distribution data store memory 209, the existing version is sent to the music server 205 (Step S308). If the requested music data stored in the distribution data store memory 209 is reported in response to the received reception number, the music server 205 compares its version with a version of music data stored in the self-server. Then, if the versions are identical, the music server sends a message to the distribution server 207 indicating that the music data does not need to be sent. If the versions are different from each other, or if the requested music data is not present on the distribution server 207, the music server sends the music data to the distribution server 207 (Step S309).

If the music data is sent from the music server 205, the distribution server 207 stores it in the distribution data store memory 209 in order to fulfill the downloading request, and also in folder E shown in FIG. 7 (Step S310). In this case, if music data of the latest version is sent since the version in the distribution data store memory is different, the distribution server 207 overwrites the music data of the latest version on the music data of the old version stored in the distribution data store memory 209, and updates the management number of the version to the newest number. If a message indicating that a transmission is not required since the music data of the latest version is stored in the distribution data store memory 209 is sent from the music server 205, the distribution server 207 reads out the corresponding music data from the distribution data store memory 209, and stores it in folder E (Step S310).

The distribution server 207, which stores the music data in folder E, sets a distribution time (Step S311). If the item "Immediately" is specified on the portable information terminal 201, the time of the specification or a time slightly removed from it is specified as the actuation attribute. On the other hand, if the item "Minimum Fee" is selected, when the process on the distribution server 207 uses an empty line, the time set at FIG. 6 as the time band at which the communication fee is low is specified as a specification time. After that, the distribution server 207 checks whether or not the specification time has arrived, on the basis of a predetermined periodic interval (Step S312). When the specification time arrives (YES), the distribution server 207 distributes the corresponding music data to the portable information terminal 201 (Step S313).

It should be noted that, in the case of distributing the music data to the portable information terminal 201, an identification number is required in order to specify the portable information terminal 201. This identification number may be registered on the portal site customized for the user, as in FIG. 4, or may be registered when an access to the home page of the music server 205 shown in FIG. 5 is obtained. The first embodiment is explained under the assumption that the distribution server 207 has the unique radio unit 210. However, when the portable information terminal 201 is a portable telephone, the music data can be distributed by using a neighboring base station as the radio unit 210. In this case, the distribution server 207 may distribute the music data by using the telephone number of the portable information terminal 201. Also, if the telephone number is sent to the music server 205 or the distribution server 207 from the portable information terminal 201 together with the data of the reception number and the like and stored correspondingly to the reception number, it can be used in distributing the music data.

Distribution of Mail

An example of a distribution server 207 distributing mail received by the mail server 206 shown in FIG. 2 will be described below. Let us suppose that the mail server 206 has a function as a POP (Post Office Protocol) server for receiving and holding mail from a portable information terminal 201. If it is assumed that the mail server 206 receives one mail destined to a user of a portable information terminal 201, sends it to the corresponding portable information terminal 201, there may be many cases when a time longer than the communication time of the content of the mail is spent on a procedure necessary for establishing connection to the portable information terminal 201. Thus, this is not cost-efficient. Also, if the user has a plurality of mail addresses, the economic efficiency is lowered since the respective mail servers 206 send the independently received mails to the portable information terminal 201. So, in the first embodiment, the distribution server 207 collectively manages and distributes the mails from the users of the portable information terminals 201 to thereby lower the communication cost.

Figure 9:
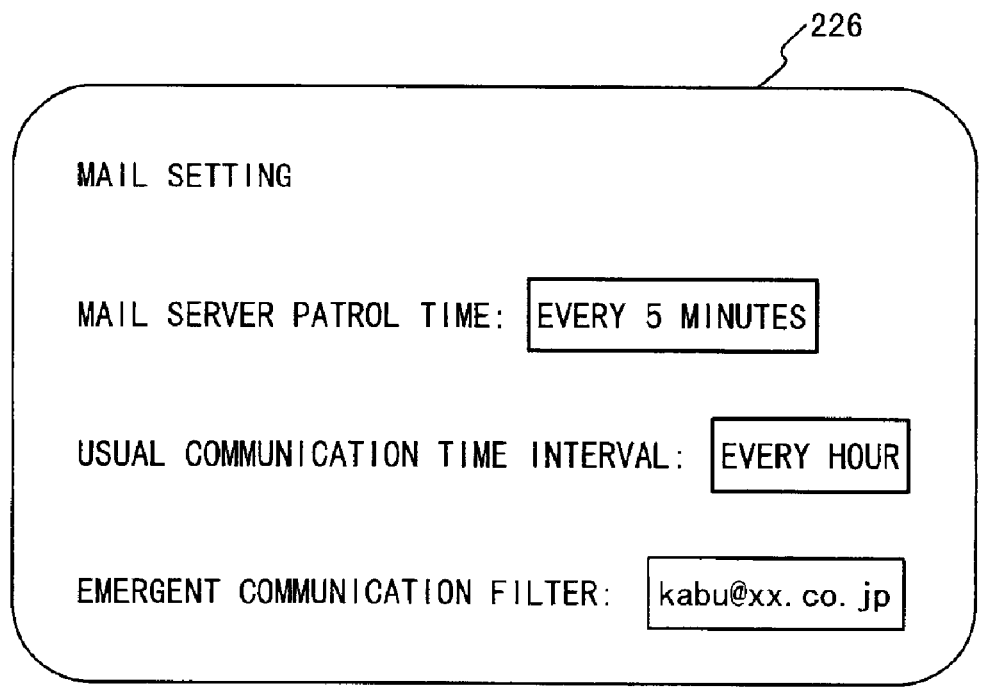
FIG. 9 is a plan view showing a portable information terminal displaying a mail setting screen of a distribution server for the purpose of setting distribution of an electronic mail, in the first embodiment.

FIG. 9 shows the condition when a portable information terminal displays a mail setting screen of a distribution server, used to set the distribution of mail. In order to display the mail setting screen shown in FIG. 9, as described in the above-mentioned example, it is enough to access the portal site sown in FIG. 4, display its menu screen, and then push the mail button 242. Thus, it is possible to access the distribution server 207 and then display its mail setting screen. Of course, the mail setting screen can be displayed by directly inputting the URL of the distribution server 207 and using a predetermined procedure.

On the mail setting screen displayed on display 226, the user can set "Mail Server Patrol Time", "Usual Communication Time Interval" and "Emergent Communication Filter". "Mail Server Patrol Time" specifies a time interval in which the distribution server 207 patrols the respective mail servers 206 in relation to the mail addresses of the user. If this interval is long, it is difficult to cope with an urgent mail. "Usual Communication Time Interval" implies a time interval, in which when mails are received and obtained by any of the mail servers 206, they are collectively sent to the portable information terminal 201 by radio. "Emergent Communication Filter" implies a filter to immediately distribute mail received from an address used to identify an urgent communication.

Figure 10:
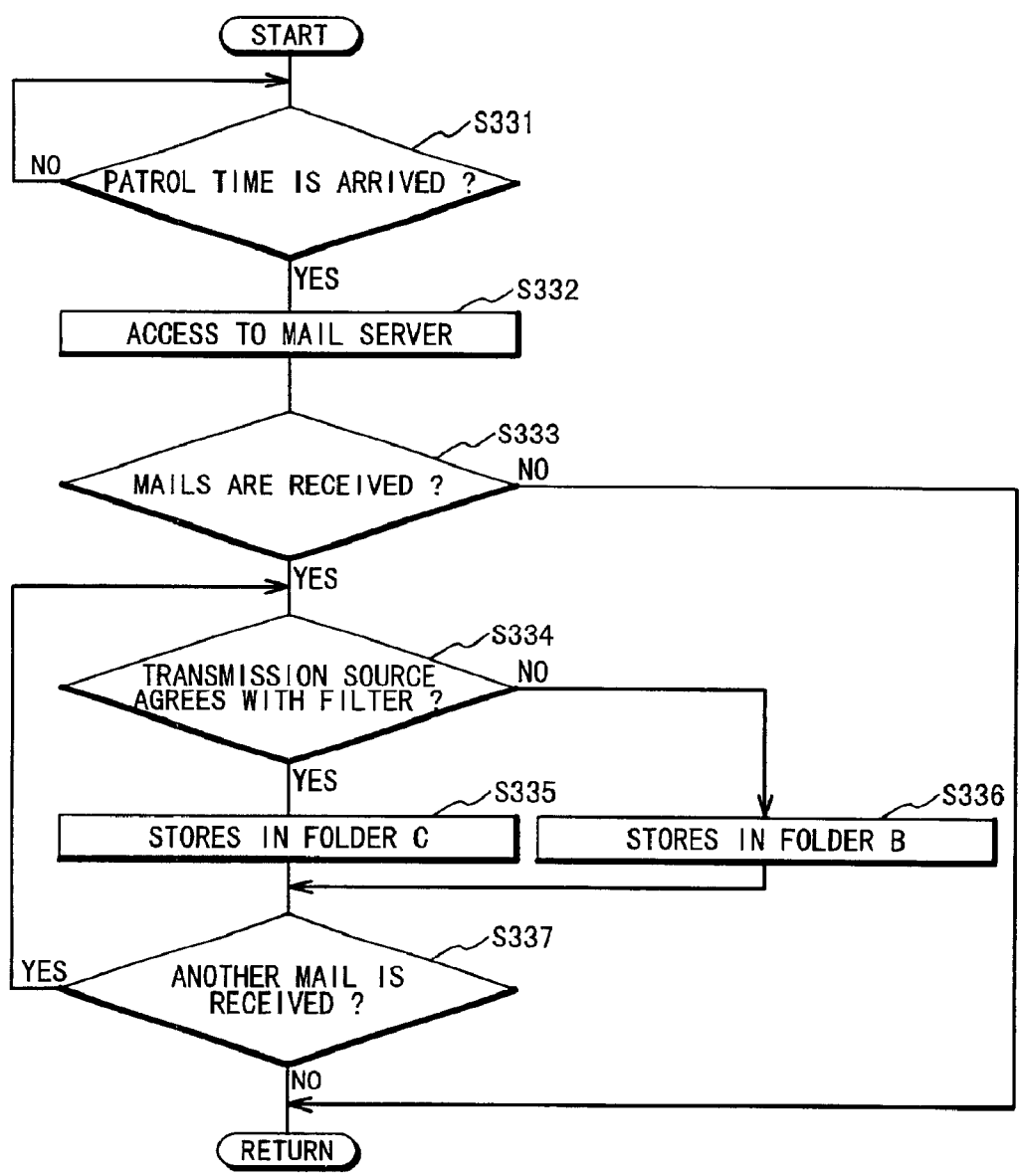
FIG. 10 is a flowchart showing the process of a distribution server accessing a mail server and storing mail in a corresponding folder, in the first embodiment.

FIG. 10 shows the flow of the process that enables the control of the above-mentioned distribution server. For each arrival of a patrol time (Step S331: YES), the distribution server 207 accesses a predetermined mail server 206 (Step S332). If mail has been received (Step S333: YES), it is fetched, and it is judged whether or not a transmission source agrees with a mail address set as "Emergent Communication Filter" (Step S334). If it agrees (YES), this mail is stored in folder C (real time actuation) shown in FIG. 7 (Step S335). The mail received from the other transmission source is not urgent. Thus, such mail is stored in folder B (for each hour) (Step S336).

If the above-mentioned division is carried out, mail server 206 (Step S337 looks whether or not another mail is received. If it is found that other mail is received (YES), steps S334–S337 are performed. If all the mail is processed in the above-mentioned manner (Step S337: NO), the process is returned back to the original state (Return). In a case that the mail is not received at step S333, a similar process is carried out.

It should be noted that the above-mentioned process uses the emergent communication filter and determines the distribution interval between the mail deliveries. However, depending on the electronic mails, the degrees of urgency can be set, one by one. With regard to such mail, the degree of urgency is checked at a processing step corresponding to step S334. The mail having high urgency may be stored in folder C, and other mail may be stored in folder B.

Figure 11:
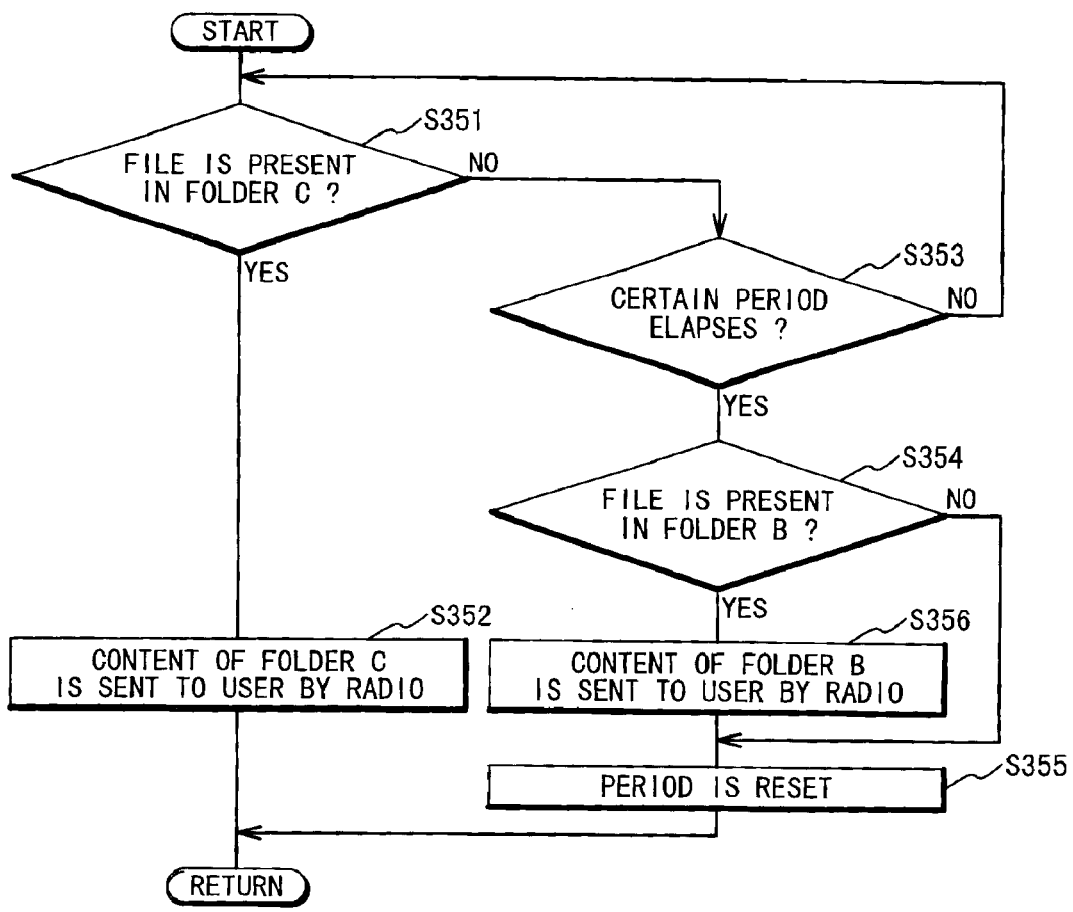
FIG. 11 is a flowchart showing the flow of an electronic mail distribution process in a distribution server, in the first embodiment.

FIG. 11 shows the flow in the distributing process of the electronic mail in the distribution server. The distribution server 207 checks folder C for the presence or absence of a mail file to be sent in (Step S351). In case there is a mail file (YES), its mail content is immediately sent to a user of a portable information terminal 201 by radio (Step S352). If there is no mail in folder C to be sent, it is checked whether or not a certain period (here, one hour) has elapsed (Step S353). If it has not elapsed (NO), the operational flow returns back to step S351 and enters a wait state.

If it is judged at step S353 that a certain period has elapsed (YES), a presence or absence of a mail file to be sent to folder B is checked (Step S354). If there is no mail file (NO), the period is reset (Step S355), and the operational flow again returns back to the process of step S351 (Return). If a mail file to be sent to folder B is present at step S354 (YES), the mail file is sent to a user of a portable information terminal 201 by radio (Step S356). After that, the operational flow proceeds to step S355, and the period is reset.

It should be noted that, FIG. 11 illustrates the distributions with regard to folders B, C. However, if the distribution server 207 is responsible for the distribution of the electronic mail as well as the other various data such as music data and the like, it is possible to distribute them in an integrated manner. In this chase, while the various folders shown in FIG. 7 are checked, the corresponding file is sent automatically or manually.

Figure 12:
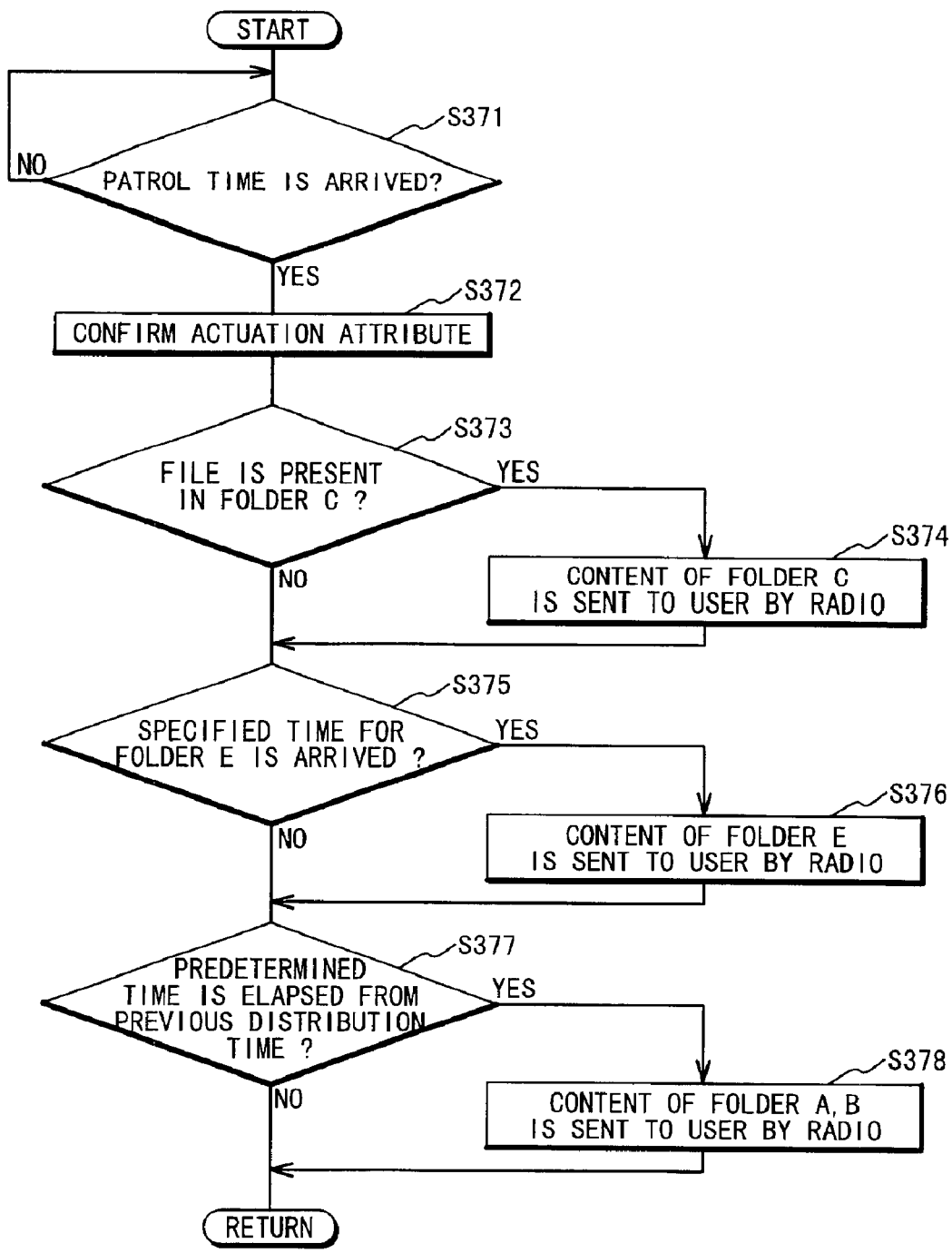
FIG. 12 is a flowchart showing the flow of a typical process in a distribution server, in the first embodiment.

FIG. 12 shows the flow of a typical process of the distribution server. If the patrol time has arrived (Step S371: YES), the distribution server 207 confirms the actuation attribute illustrated in FIG. 7 (Step S372). If the file is present in folder C (Step S373: YES), the distribution server 207 distributes the file (Step S374). Next, it is checked whether or not the time specified for folder E has arrived (Step S375). In a case of the specified time is arrived (YES), the file stored in the folder E is distributed (Step S376). Next, it is checked whether or not a predetermined time (for example, one hour) elapses from a previous distribution time with regard to the folders A, B (Step S377). If it elapses (YES), the files present in the folders A, B are distributed (Step S378).

It should be noted that it is not always necessary to independently carry out the distribution for each folder. The respective files may be copied to a buffer region, and the files targeted for the distribution may be collectively targeted for the transmission, in accordance with a series of procedures. Thus, for example, the electronic mail and the music data are collectively distributed at the same time. Hence, it is possible to drop the cost necessary for the distribution.

(Second Embodiment)

Figure 13:
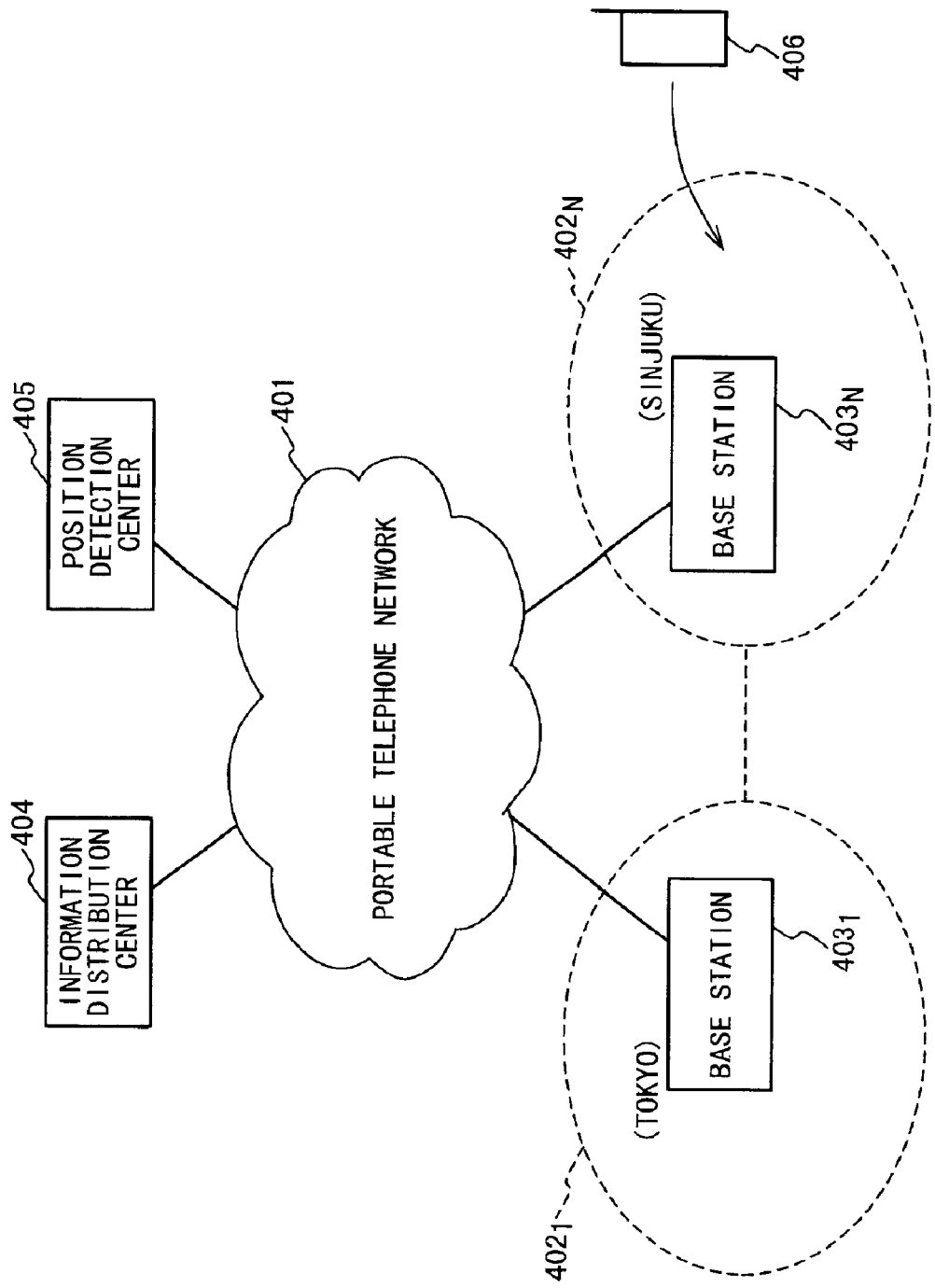
FIG. 13 is a system configuration view showing a schematic configuration of a communication system in a second embodiment.

FIG. 13 shows the schematic configuration of a communication system in a second embodiment of the present invention. The communication system is composed of a portable telephone network 401, base stations $403_1$ to $403_N$ responsible for respective service areas $402_1$ to $402_N$, an information distribution center 404, and a position detection center 405 that are connected to the portable telephone network 401. In this communication system, when a portable telephone 406 serving as a portable information terminal enters into a predetermined particular service area 402, the position detection center 405 detects it. Then, in accordance with an actuation attribute "Position" that is not included in the actuation attributes shown in FIG. 7 of the first embodiment, data for the service area 402 is sent to the portable telephone 406. So, a territory guide service is carried out by using a voice or a picture. It should be noted that, it may be designed that the position detection center 405 detects a position, on the basis of a base station that manages the portable telephone 406 or detects the position by using another position detector such as GPS (Global Positioning System).

Figure 14:
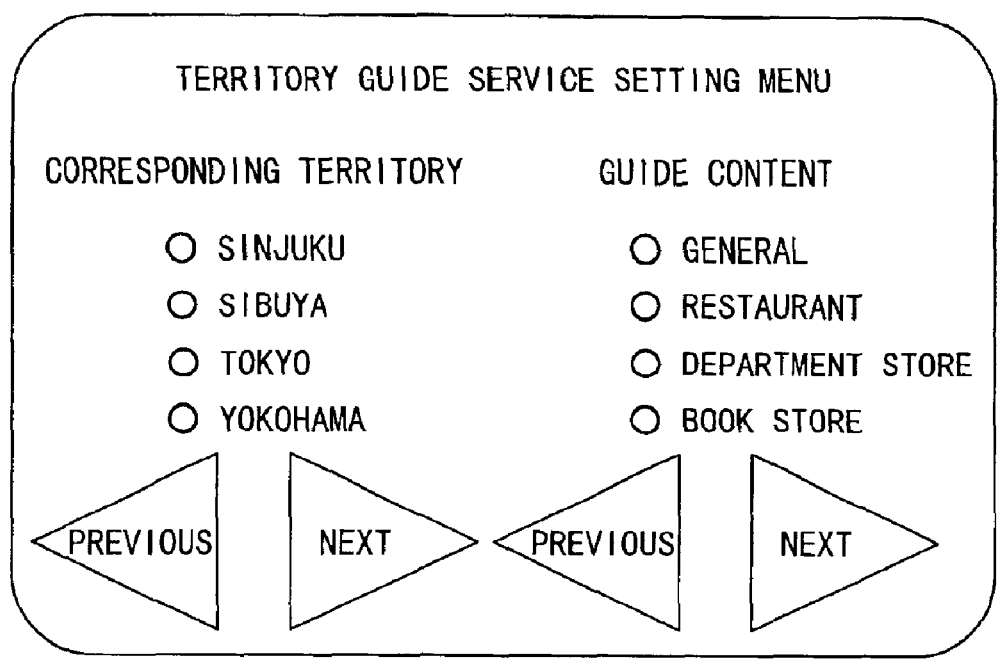
FIG. 14 is a plan view of a display showing an example of a setting menu of a territory guide service, in the second embodiment.

FIG. 14 shows an example of a setting menu of a territory guide service displayed on a display of a portable telephone, in the second embodiment. A user of the portable telephone 406 shown in FIG. 13 carries out a predetermined operation to display this setting menu on a display 411. This menu is designed so that a "Corresponding Territory (service area)" targeted for a guide and a "Guide Content" can be selected by using a radio button. For example, let us suppose that the user of the portable telephone 406 indicates Sinjuku as "Corresponding Territory" and indicates a restaurant as "Guide Content". Then, when the portable telephone 406 of the user enters into the service area $402_N$ of Sinjuku, the position detection center 405 sends position information together with an ID of the portable telephone 406 to the information distribution center 404. The information distribution center 404 has a table as shown in FIG. 7 of the first embodiment. So, it wirelessly transmits data with regard to the restaurants in Sinjuku to the corresponding portable telephone 406. The function attribute in this example may be "Synchronization".

The user of the portable telephone 406 can receive similar services in a plurality of territories (service areas). Thus, if the user indicates two territories (for example, Sinjuku and Tokyo) in advance, when the portable telephone 406 enters into a service area $402_1$ of Tokyo, the user can receive guide of desirable shops, such as restaurants, bookstores and the like, and tourist spots and the like near Tokyo Station.

(Third Embodiment)

Figure 15:
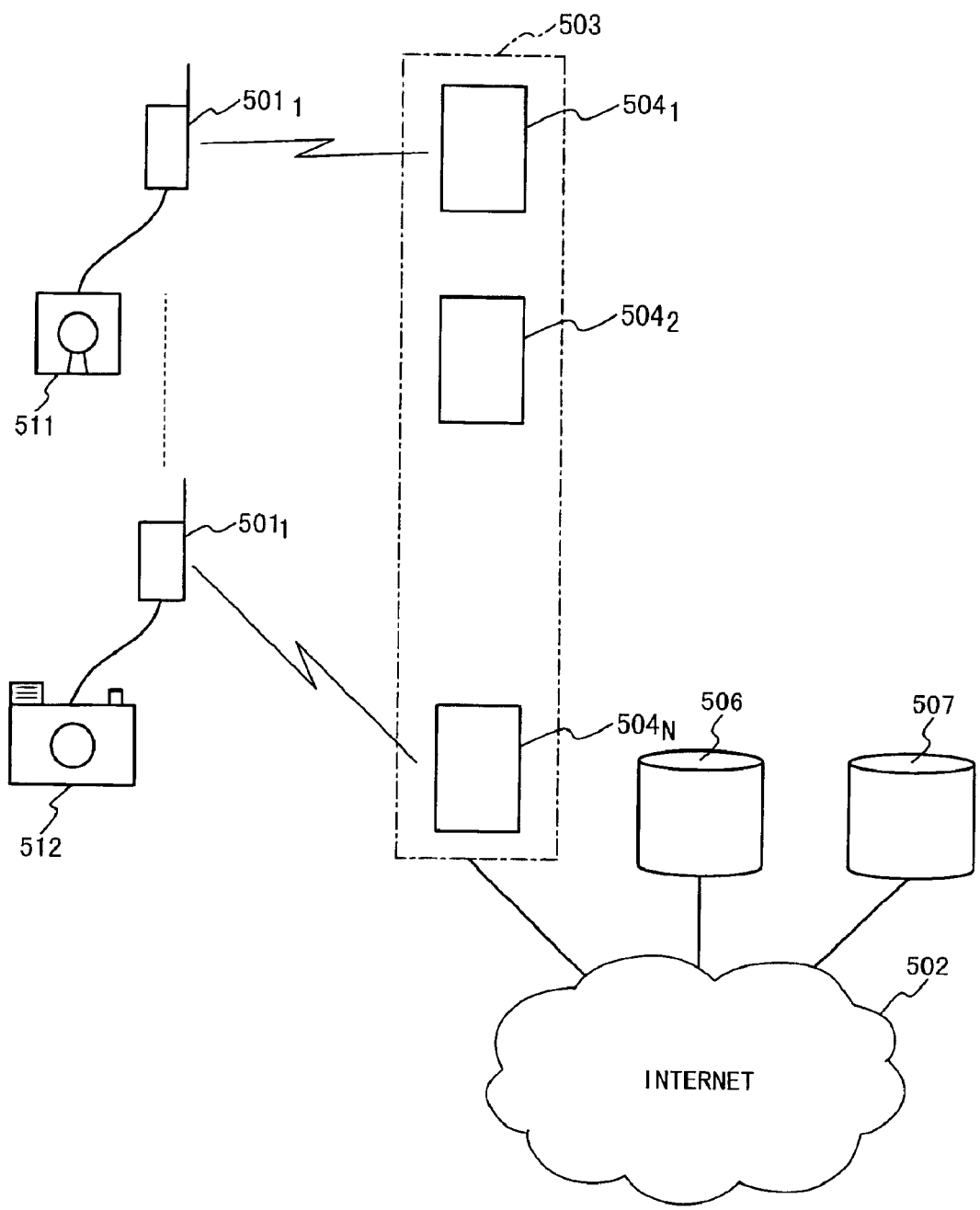
FIG. 15 is a system configuration view showing a schematic configuration of a communication system in a third embodiment of the present invention.

FIG. 15 shows a schematic configuration of a communication system in a third embodiment of the present invention. This communication system is configured so that portable telephones $501_1$ to $501_N$ of respective persons have respective dedicated memory regions $504_1$ to $504_N$ in a distribution server 503 on the Internet 502. That is, the first portable telephone $501_1$ has a dedicated first memory region $504_1$ in the distribution server 503. Similarly, the N-th portable telephone $501_N$ has a dedicated N-th memory region $504_N$ in the distribution server 503. On the Internet 502, for example, there is a camera shop server 506 managed by a camera show or a card print server 507 managed by a card print shop.

Let us suppose that an owner of the first portable telephone $501_1$ holds data to make a card in a memory medium 511 and this data is uploaded to the card print server 507. In this case, the owner of the first portable telephone $501_1$ wirelessly uploads it to the first memory region $504_1$ dedicated to the owner in the distribution server 503, while "Data For Making Card", "Transfer" Data and "Distribution Time" are clearly written. Similarly, let us suppose that an owner of the N-th portable telephone $501_N$ wants a large-sized print of a picture photographed by a digital camera 512. So, an output terminal of the digital camera 512 is connected to the N-th portable telephone $501_N$, and its picture data is wirelessly updated to the N-th memory region $504_N$ dedicated to the owner in the distribution server 503 while "Data For Camera Shop", "Transfer" data and "Distribution Time" are clearly written. A plurality of data can be stored in the respective dedicated memory regions $504_1$ to $504_N$, such as "Data For Making Card" and "Data For Camera Shop".

The distribution server 503 periodically scans the memory regions $504_1$ to $504_N$. If "Transfer" data is stored in any of those regions, "Distribution Time" is read out as a condition and a destination of the data to then distribute to a corresponding server at an indicated time. In a case of "Data For Making Card" stored in the first memory region $504_1$, for example, this is distributed to the indicated card print server 507 at the indicated time. Also, in a case of "Data For Camera Shop", this is distributed to the indicated camera shop server 506 at the indicated time.

As mentioned above, in the third embodiment of the present invention, since the distribution server 503 is installed, it is not required that a plurality of card print servers 507 themselves are placed, even if there is a time frame in which accesses are concentrated on the card print server 507. Moreover, the respective servers, such as the camera shop server 506 and the card print server 507, can commonly use the distribution server 503. Thus, it is possible to attain a very effective communication system. Of course, the dedicated memory regions $504_1$ to $504_N$ are not always used only for "Transfer" data. The function attribute may be set to "Synchronization". For example, when the distribution server 503 obtains data from a certain server and inserts it into the first memory region $504_1$, the data may be automatically sent out to the first portable telephone $501_1$. Even in this case, it is naturally possible to select a time frame for distribution and cheaply send data.

As mentioned above, according to the first aspect of the present invention, the distribution server and client terminal have any number of folders in which at least parts thereof correspond to each other, and the distribution server stores a file read from a content server in the first folder. For example, if the downloading of a predetermined file is requested by a number of client terminals, and a long time is required in order to transfer the file to those client terminals, the content server to which the file is requested stores the file in the first folder of the distribution server. Then, the actuation time can be suitably set to thereby disperse the loads in the entire communication system. Moreover, the file is wirelessly communicated between the distribution server and client terminals. Thus, it is also possible to reduce the load on the telephone line.

Also, according to the first aspect of the present invention, the loads can be dispersed without any increase of the facility, by using the distribution server for the transfer of the file in the content server or the like, on which the accesses from the client terminals are temporarily concentrated.

Moreover, according to the first aspect of the present invention, the periodical actuation is carried out as one manner of the actuation of the actuation timing setting section. Thus, the processes themselves on the distribution server can be dispersed by properly setting the periodic interval if the transfer of the file is not urgent.

According to the first aspect of the present invention, the actuation timing setting section sets the time when the actuation is carried out. So, the technique for using the nighttime in the case of file transfer having no emergency can be used to thereby lower the communication fee and also attain the effective usage of the distribution server.

According to the first aspect of the present invention, the actuation timing setting section is actuated when the new file is stored in the first folder. Thus, as for the transfer of the urgent file, this enables its request to be executed. Of course, if the distribution server is responsible for the distributions of the files from the various servers and the like, the timings of the transfers of the urgent files can be dispersed entirely and temporally. Hence, there is little fear that the loads are concentrated in one particular time.

Also, according to the second aspect of the present invention, the position is used as the factor of file transfer. Thus, the necessary information with the position information as the trigger can be sent to the movable apparatus such as the portable telephone and the like. Hence, this is effective for the guide of position and the like.

Moreover, according to the third aspect of the present invention, if the uploading operations of the files from the mobile terminals are concentrated on the predetermined regions among the several particular memory regions, the distribution server is placed between them. Then, the mobile terminals store the file in the individual memory region corresponding to each of the mobile terminals within the distribution server. Thus, the concentration of the loads can be avoided. Hence, this has the merit that the mobile terminal can transmit and receive the file without directly recognizing the location of the particular memory region.

What is claimed is:

1. A communication system comprising:
   a network;
   a plurality of content servers, each connected to the network;
   a distribution center connected to said network and connected to said plurality of content servers by dedicated communication channels; and
   a client terminal connected to said network;
   wherein said distribution center comprises:
      a first folder which stores a file read from one of said plurality content servers connected to said network and connected to said distribution center by dedicated communication channels;
      an actuation timing setting section which sets an actuation timing to process the file stored in said first folder;
      a radio transmitter which, when the actuation timing set by said actuation timing setting section has occurred, reads out the file from said first folder and wirelessly transmits the read file to said client terminal; and
   said client terminal comprises:
      a radio receiver which wirelessly receives the file transmitted from said radio transmitter; and
      a second folder which is correlated with said first folder and stores the file received by the radio receiver.

2. The communication system according to claim 1, wherein said actuation timing setting section sets a periodic interval as the actuation timing.

3. The communication system according to claim 2, wherein said actuation timing setting section further sets a time as the actuation timing.

4. The communication system according to claim 1, wherein said actuation timing setting section further sets a real time as the actuation timing; and
   said radio transmitter, when a new file is stored in said first folder, reads out the new file from said first folder and wirelessly transmits the read new file to said client terminal; and
   wherein the new file stored in said first folder is removed after the new file is transferred to said second folder through said radio transmitter and said radio receiver and is stored therein.

5. The communication system according to claim 1, wherein said actuation timing setting section sets a time as the actuation timing.

6. A communication system comprising:
   a network;
   a distribution server connected to said network; and
   a client terminal connected to said network;
   wherein said distribution server comprises:
      a first folder which stores a file read from a content server connected to said network;
      an actuation timing setting section which sets an actuation timing to process the file stored in said first folder;
      a radio transmitter which, when the actuation timing set by said actuation timing setting section is arrived, reads out the file from said first folder and wirelessly transmits the lead file to said client terminal; and
   said client terminal comprises:
      a radio receiver which wirelessly receives the file transmitted from said radio transmitter; and
      a second folder which is correlated with said first folder and stores the file received by the radio receiver;
   wherein said actuation timing setting section further sets a real time as the actuation timing; and
   when a new file is stored in said first folder, said radio transmitter reads out the new file from said first folder and wirelessly transmits the read new file to said client terminal; and
   wherein the new file stored in said first folder is removed after the new file is transferred to said second folder through said radio transmitter and said radio receiver and is stored therein.

7. A communication system comprising:
   a network;
   a distribution center which is connected to said network and has a first folder;
   a mobile terminal which is connected to said network and has a second folder correlated with said first folder; and
   a position detector which detects a current position of said mobile terminal and is connected to said network;
   wherein when said position detector detects when the current position of said mobile terminal is in a predetermined position and sends the position information together with an ID of said mobile terminal to the information distribution center; and
   wherein said distribution center includes a file transmitting section which wirelessly transmits a file stored in advance in said first folder to said second folder after it receives the information from said position detector.

8. The communication system according to claim 7, wherein the file transmitted by said file transmitting section includes information of a predetermined territory; and
   said mobile terminal has a display which displays the information of the territory when receiving the file.

9. A communication system comprising:
   a network;
   a mobile terminal which has a first folder and a first communication unit for carrying out a radio communication;
   at least one server connected to the network providing at least one service;
   a distribution center which is connected to said network and has a memory region correlated to said first folder and a second communication unit for carrying out a radio communication; and
   when a file has been transmitted by the mobile terminal, stored in the memory region of the distribution center and identified by the distribution center as requesting a particular service, a file transferring unit transmits the file to said at least one server that provides the relevant service; and
   when the file that has undergone the requested processing in the at least one server is transmitted to and stored in the memory region of the first distribution center, the file transferring unit transfers the file to said first folder which is connected through said network to said distribution center.

10. A communication system comprising:
    a network;
    a plurality of content servers, each connected to the network;
    a distribution device connected to said network and connected to said plurality of content servers by dedicated communication channels; and
    a client terminal connected to said network;
    wherein said distribution center comprises:

a first folder which stores a file read from one of said plurality content servers connected to said network and connected to said plurality of content servers by dedicated communication channels;

an actuation timing setting section which sets a user-specified actuation timing to process the file stored in said first folder;

a radio transmitter which, when the actuation timing set by said actuation timing setting section has occurred, reads out the file from said first folder and wirelessly transmits the read file to said client terminal; and said client terminal comprises:

a radio receiver which wirelessly receives the file transmitted from said radio transmitter; and a second folder which is correlated with said first folder and stores the file received by the radio receiver.

11. A communication system comprising:

a network;

a distribution center connected to said network; and a client terminal connected to said network;

wherein said distribution center comprises:

a first folder which stores a file read from a content server connected to said network;

an actuation timing setting section which sets an actuation timing to process the file stored in said first folder;

a radio transmitter which, when the actuation timing set by said actuation timing setting section has occurred, reads out the file from said first folder and wirelessly transmits the read file to said client terminal; and said client terminal comprises:

a radio receiver which wirelessly receives the file transmitted from said radio transmitter; and a second folder which is correlated with said first folder and stores the file received by the radio receiver;

wherein when a new file is stored in said first folder, said radio transmitter reads out the new file from said first folder and wirelessly transmits the read new file to said client terminal; and wherein the new file stored in said first folder is removed after the new file is transferred to said second folder through said radio transmitter and said radio receiver and is stored therein.

12. The communication system according to claim 11, wherein said actuation timing setting section sets a periodic interval as the actuation timing.

13. The communication system according to claim 11, wherein said actuation timing setting section further sets a time as the actuation timing.

* * * * *